United States Patent
Lakkur et al.

(10) Patent No.: US 10,489,395 B2
(45) Date of Patent: Nov. 26, 2019

(54) METHODS AND SYSTEMS FOR PROVIDING FUNCTIONAL EXTENSIONS WITH A LANDING PAGE OF A CREATIVE

(71) Applicant: Google Inc., Mountain View, CA (US)

(72) Inventors: Manu Lakkur, Palo Alto, CA (US); Conrad Wai, San Francisco, CA (US); Manzurur Rahman Khan, Mountain View, CA (US); Shibani Sanan, Saratoga, CA (US); Surojit Chatterjee, Los Altos, CA (US); Paul Feng, Palo Alto, CA (US); Zachary Russell Bailey, San Francisco, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/584,959

(22) Filed: May 2, 2017

(65) Prior Publication Data
US 2017/0235791 A1    Aug. 17, 2017

Related U.S. Application Data

(63) Continuation of application No. 14/324,985, filed on Jul. 7, 2014.
(Continued)

(51) Int. Cl.
*G06F 16/958* (2019.01)
*G06F 16/242* (2019.01)
(Continued)

(52) U.S. Cl.
CPC .......... *G06F 16/2448* (2019.01); *G06F 3/048* (2013.01); *G06F 3/04812* (2013.01);
(Continued)

(58) Field of Classification Search
CPC ............. G06F 17/2247; G06F 17/2235; G06F 17/30887; G06F 17/30014;
(Continued)

(56) References Cited

U.S. PATENT DOCUMENTS 5,940,834 A    8/1999    Pinard et al.
5,960,409 A    9/1999    Wexler
(Continued)

FOREIGN PATENT DOCUMENTS

JP    2009-503655    1/2009
JP    2012-118660 A    6/2012
(Continued)

OTHER PUBLICATIONS

"Amazon and Google Want to Turn Their Smart Home Speakers Into Telephone Replacements—Mac Rumors" MacRumors, 9 pages.
(Continued)

*Primary Examiner* — Thu V Huynh
(74) *Attorney, Agent, or Firm* — Foley & Lardner LLP; James De Vellis

(57) ABSTRACT

Systems and methods for providing functional extensions on a landing page of a creative. The method includes identifying, by a data processing system, a creative for serving on a computing device. The creative can be associated with a network address of a landing page. The method also includes generating, by the data processing system, an actionable object, such as a functional extension, to be rendered with content of the landing page and providing, by the data processing system, the actionable object to be rendered with the content of the landing page responsive to an action taken on the creative when served on the computing device. Examples of functional extensions include click-to-call extensions and directions extensions.

20 Claims, 5 Drawing Sheets

Related U.S. Application Data

(60) Provisional application No. 61/941,751, filed on Feb. 19, 2014.

(51) Int. Cl.
| | | |
|---|---|---|
| *G06F 16/957* | (2019.01) | |
| *G06F 17/22* | (2006.01) | |
| *G06F 3/048* | (2013.01) | |
| *G06F 9/451* | (2018.01) | |
| *G06F 3/0481* | (2013.01) | |
| *G06F 16/00* | (2019.01) | |
| *G06Q 30/06* | (2012.01) | |

(52) U.S. Cl.
CPC ............ *G06F 9/451* (2018.02); *G06F 16/958* (2019.01); *G06F 16/9577* (2019.01); *G06F 16/986* (2019.01); *G06F 17/2235* (2013.01); *G06F 17/2247* (2013.01); *G06F 16/00* (2019.01); *G06Q 30/0641* (2013.01)

(58) Field of Classification Search
CPC ........... G06F 17/30882; G06F 16/2448; G06F 16/986; G06F 16/958; G06F 16/9577; G06F 16/00; G06F 3/048; G06Q 30/0641
See application file for complete search history.

(56) References Cited

U.S. PATENT DOCUMENTS

| | | | |
|---|---|---|---|
| 6,275,806 B1 | 8/2001 | Pertrushin | |
| 6,401,077 B1* | 6/2002 | Godden | G06Q 30/06 |
| | | | 705/26.8 |
| 6,493,447 B1 | 12/2002 | Goss et al. | |
| 6,670,968 B1* | 12/2003 | Schilit | G06F 17/30899 |
| | | | 707/E17.119 |
| 6,684,249 B1 | 1/2004 | Frerichs et al. | |
| 6,857,007 B1 | 2/2005 | Bloomfield | |
| 7,559,034 B1 | 7/2009 | Paperny et al. | |
| 7,853,255 B2 | 12/2010 | Karaoguz et al. | |
| 8,176,431 B1* | 5/2012 | Scannell | G06F 9/4443 |
| | | | 715/762 |
| 8,195,133 B2 | 6/2012 | Ramer et al. | |
| 8,386,386 B1 | 2/2013 | Zhu | |
| 8,806,327 B2 | 8/2014 | Morris | |
| 8,903,716 B2 | 12/2014 | Chen et al. | |
| 9,195,290 B2 | 11/2015 | Siliski et al. | |
| 2002/0069223 A1 | 6/2002 | Goodisman et al. | |
| 2004/0254857 A1* | 12/2004 | Onizuka | G06Q 30/02 |
| | | | 705/26.1 |
| 2006/0099931 A1* | 5/2006 | Trujillo | H04L 29/1216 |
| | | | 455/412.1 |
| 2007/0022442 A1 | 1/2007 | Gil et al. | |
| 2007/0097975 A1 | 5/2007 | Rakers et al. | |
| 2007/0127688 A1 | 6/2007 | Doulton | |
| 2007/0239524 A1 | 10/2007 | Tewahade | |
| 2008/0126949 A1 | 5/2008 | Sharma | |
| 2009/0254824 A1 | 10/2009 | Singh | |
| 2009/0300496 A1 | 12/2009 | Fan et al. | |
| 2009/0327084 A1 | 12/2009 | Patton et al. | |
| 2010/0134275 A1 | 6/2010 | Fitzgerald et al. | |
| 2010/0198680 A1 | 8/2010 | Ma et al. | |
| 2011/0093589 A1 | 4/2011 | Dale et al. | |
| 2011/0197200 A1 | 8/2011 | Huang et al. | |
| 2011/0271184 A1 | 11/2011 | Sima et al. | |
| 2012/0265528 A1 | 10/2012 | Gruber et al. | |
| 2013/0019202 A1 | 1/2013 | Regan et al. | |
| 2013/0086201 A1 | 4/2013 | Legge | |
| 2013/0110565 A1 | 5/2013 | Means et al. | |
| 2013/0117022 A1 | 5/2013 | Chen et al. | |
| 2013/0145361 A1 | 6/2013 | Kaegi | |
| 2013/0151314 A1* | 6/2013 | Kugler | G06Q 30/0201 |
| | | | 705/7.32 |
| 2013/0275164 A1 | 10/2013 | Gruber et al. | |
| 2013/0304758 A1 | 11/2013 | Gruber et al. | |
| 2014/0040786 A1 | 2/2014 | Swanson et al. | |
| 2014/0136949 A1 | 5/2014 | Wang | |
| 2014/0222436 A1 | 8/2014 | Binder et al. | |
| 2015/0169187 A1* | 6/2015 | Calvelo Aros | G06F 11/302 |
| | | | 715/704 |
| 2015/0213485 A1 | 7/2015 | Wang et al. | |
| 2015/0234542 A1 | 8/2015 | Kirillov | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |

FOREIGN PATENT DOCUMENTS

| | | |
|---|---|---|
| JP | 2012-138100 | 7/2012 |
| KR | 10-2013-0035983 | 4/2019 |

OTHER PUBLICATIONS

"Apple Patent Reveals a New Security Feature Coming to Siri" 6 pages.
"Introducing Echo Look Hands-Free Camera and Style Assistant" 1996-2017, Amazon.com, Inc. 5 pages.
"The Patent Behind Google Home's New Feature of Understanding Different Voices in the Home Surfaced Today", Apr. 20, 2017, 5 pages.
ADStrix Attractive Offering for SMB's, 5 pgs, searched (Mar. 2014) via online at http://www.adstrix.com/?page_id=17.
Close, "Amazon Echo Will Give You These Deals If You Order Through Alexa This Weekend," Web Article, Nov. 18, 2016, Time.com (2 pages).
Collins, Terry "Can Twitter Save itself? The Social Network is Slowly gaining users, but still Lags Far Behind Rivals. Is a Turnaround Possible?" 3 pages.
Cook, "A Siri for advertising: These mobile ads talk back to you," Web Article, Apr. 1, 2013, Geekwire.com (7 pages).
Dudamobile, 4 pages (Search Mar. 2014), via online at http://www.dudamobile.com/features.
Golgowski, Nina, "This Burger King Ad Is Trying to Control Your Google Home Device", Apr. 12, 2017, 7 pages.
Hay, Deltina, The Bootstrapper's Guide to the New Search Optimization: Mastering the New Rules of Organic Search Using Relevancy, Context, and Semantics; Linden Publishing, Dec. 1, 2013—Business & Economics—pp. 205-208.
International Preliminary Report on Patentability on PCT/US2015/016483, dated Sep. 1, 2016, 9 pgs.
International Search Report/Written Opinion on PCT/US2015/016483, dated Apr. 9, 2015, 11 pgs.
Larson, Selena "Google Home Now Recognizes your Individual Voice" dated Apr. 20, 2017, 3 pages.
Nieva, Richard, "Google Home and eBay can tell you how much that's worth", 3 pages.
Purcher, Jack "Today Google Home's Virtual Assistant Can Learn its Owner's Voice for Security Reason's like Apple's Patent Pending Idea" Apr. 20, 2017, 4 pages.
Seifert, Dan "Samsung's New Virtual Assistant Will Make Using Your Phone Easier", Mar. 20, 2017, 7 pages.
Sherr, Ian "IBM Built a Voice Assistant for Cybersecurity" dated Feb. 13, 2017, 4 pages.
Siegal, Daniel, "IP Attys Load Up Apps' Legal Challenges At Silicon Beach" 6 pages.
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
U.S. Office Action on U.S. Appl. No. 14/324,985 dated Mar. 10, 2016, 12 pgs.
U.S. Office Action on U.S. Appl. No. 14/324,985 dated Nov. 18, 2016.
U.S. Office Action on U.S. Appl. No. 14/324,985 dated Jul. 28, 2016, 11 pgs.
"Walmart and Google to offer voice-enabled shopping", BBC News, Aug. 23, 2017.

(56) References Cited

OTHER PUBLICATIONS

Crist, Ry, "Logitech Harmony's Alexa Skill just got a whole lot better", cnet, Jul. 13, 2017 (2 pages).
Forrest, Conner, "Essential Home wants to be bridge between Amazon's Alexis, Apple's Siri, and Google Assistant", TechRepublic, May 31, 2017 (10 pages).
Gibbs, Samuel, "Your Facebook Messenger app is about to be filled with ads", The Guardian, Jul. 12, 2017 (3 pages).
Hardwick, Tim, "Facebook Smart Speaker Coming Next Year With 15-inch Touch Panel", MacRumors, Jul. 25, 2017 (5 pages).
Kelion, Leo, "Amazon's race to make Alexa smarter", BBC News, Jul. 28, 2017 (8 pages).
U.S. Office Action on U.S. Appl. No. 14/324,985 dated Aug. 24, 2017.
U.S. Office Action on U.S. Appl. No. 14/324,985 dated Aug. 24, 2017, 20 pages.
Broussard, Mitchel, "Chatbot-Like Siri Patent Includes Intelligent Image, Video, and Audio Recognition Within Messages", MacRumors, May 11, 2017, 11 pages.
Chen, Yilun Lulu, "Alibaba Challenges Google, Amazon With New Echo-Like Device", Bloomberg, Jul. 5, 2017, 3 pages.
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '" Cnet, May 18, 2017, 7 pages.
Google Developers Newsletter "Google Assistant SDK", developers.google.com, 2 pages.
Gurma, Mark and Webb, Alex, "Apple Is Manufacturing a Siri Speaker to Outdo Google and Amazon", Bloomberg, May 31, 2017, 3 pages.
Koetsier, John, "Ads on Amazon Echo: Wendy's, ESPN, and Progressive Among Brands Testing", Forbes, May 11, 2017, 3 pages.
Lee, Dave, "The five big announcements from Google I/O", BBC, May 18, 2017, 11 pages.
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Sablich, Justin, "Planning a Trip With the Help of Google Home", New York Times, dated May 31, 2017, 6 pages.
Smith, Dave, "The Amazon Echo got 2 incredibly useful features thanks to a new update", Business Insider, Jun. 1, 2017, 2 pages.
U.S. Office Action on U.S. Appl. No. 14/324,985 dated May 4, 2017.
Willens, Max, "For publishers, Amazon Alexa holds promise but not much money (yet)", Digiday, Jul. 6, 2017, 5 pages.
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
Buckland et al., "Amazon's Alexa Takes Open-Source Route to Beat Google Into Cars", Bloomberg, Feb. 27, 2018, 6 pages.
Japanese Office Action for Appl. Ser. No. 2016-552970 dated Feb. 5, 2018 (9 pages).
South Korean Office Action for Appl. Ser. No. 10-2016-7025724 dated Apr. 30, 2018 (2 pages).
U.S. Office Action on U.S. Appl. No. 14/324,985 dated Mar. 8, 2018.
Examination Report for EP Application No. 15706662.2 dated Jan. 31, 2019.
Non-Final Office Action on U.S. Appl. No. 14/324,985 dated Jan. 2, 2019.
Chinese Office Action on Appl. Ser. No. 201580009690.X dated Dec. 29, 2018 (13 pages).
https://fitsmallbusiness.com/high-converting-facebook-landing-page/ accessed Aug. 23, 2019.
https://www.facebook.com/business/help/438193446367413 accessed Aug. 23, 2019.

\* cited by examiner

METHODS AND SYSTEMS FOR PROVIDING FUNCTIONAL EXTENSIONS WITH A LANDING PAGE OF A CREATIVE

RELATED APPLICATION

This application claims the benefit of priority under 35 U.S.C. § 120 as a continuation of U.S. patent application Ser. No. 14/324,985, filed Jul. 7, 2014, and titled "Methods and Systems for Providing Functional Extensions With a Landing Page of a Creative", which claims the benefit of priority under 35 U.S.C. § 119 to U.S. Provisional Patent Application 61/941,751, filed Feb. 19, 2014, and titled "Methods and Systems for Providing Functional Extensions With a Landing Page of a Creative," each of which are hereby incorporated by reference herein in their entirety.

BACKGROUND

Oftentimes, the landing page of a creative served on a mobile device is not optimized for mobile devices. As a result, the conversion rate of visitors of the landing page of the creative may be a lot lower than a landing page that is optimized for mobile devices. That being said, even landing pages that are optimized for mobile devices still struggle to convert visitors. This may be because the mobile device user may not be willing to put in the effort to find the information they are looking for and therefore, may leave the landing page without performing additional actions.

SUMMARY

At least one aspect is directed to a method for providing actionable objects on a landing page of a creative. The method includes identifying, by a data processing system, a creative for serving on a computing device. The creative can be associated with a network address of a landing page. The method also includes generating, by the data processing system, an actionable object to be rendered with content of the landing page and providing, by the data processing system, the actionable object to be rendered with the content of the landing page responsive to an action taken on the creative when served on the computing device.

In some implementations, the data processing system can generate an information resource that includes content of the landing page and the generated actionable object. The data processing system can also associate a network address of the information resource to the creative such that responsive to an action taken on the creative, the information resource is rendered. In some implementations the data processing system can render the actionable object on a first frame of the information resource and the content of the landing page on a second frame of the information resource. In some implementations, the first frame is rendered over the second frame. In some implementations, the first frame of the information resource includes an actionable item, which when selected, removes the first frame from the information resource rendered for display.

In some implementations, the data processing system can receive, in response to providing the actionable object, an indication of an action taken on the actionable object. The data processing system can then increment a conversion count responsive to receiving the indication.

In some implementations, the actionable object is configured to cause the computing device on which the actionable object is rendered to execute a particular task. In some implementations, the particular task includes one of launching a phone application, a location application, or another dedicated application.

In some implementations, the data processing system can provide a script for insertion in the landing page associated with the content. The script can be configured to cause the generated actionable object to be rendered for display with the content of the landing page responsive to an action taken on the creative.

In some implementations, the data processing system can analyze the content of the landing page to identify a particular type of content. In some implementations the data processing system can identify the particular type of content in the content of the landing page and use the identified particular type of content to generate the actionable object.

According to another aspect, a system for providing actionable objects on a landing page of a creative includes a data processing system. The data processing system is configured to identify a creative for serving on a computing device. The creative associated with a network address of a landing page. The data processing system is further configured to generate an actionable object to be rendered with content of the landing page and provide the actionable object to be rendered with content of the landing page responsive to an action taken on the creative when served on the computing device.

According to yet another aspect, a computer-readable storage medium storing instructions that when executed by a data processor, cause the data processor to perform operations is disclosed. The operations include identifying a creative for serving on a computing device, generating an actionable object to be rendered with content of the landing page and providing the actionable object to be rendered with content of the landing page responsive to an action taken on the creative when served on the computing device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
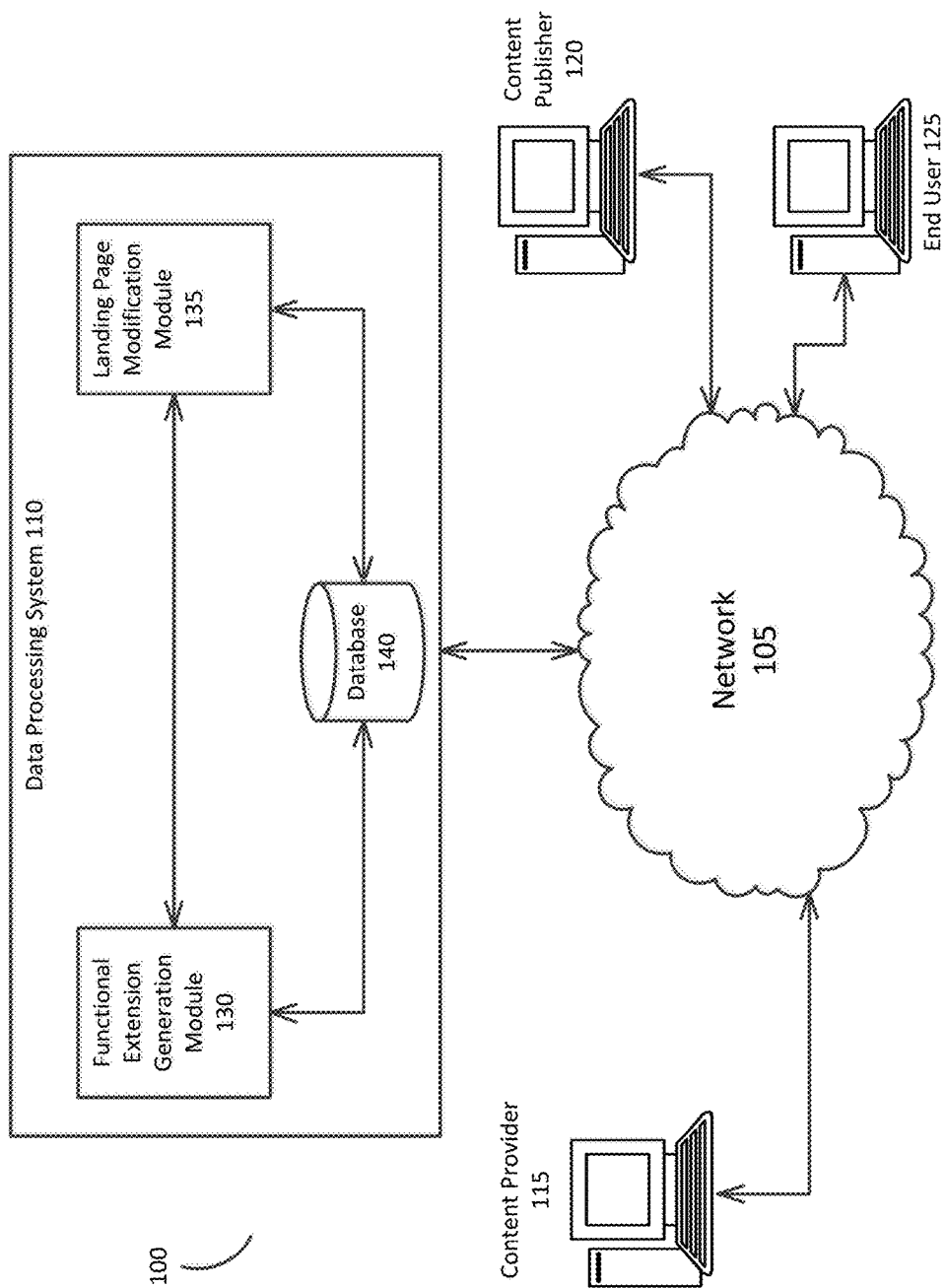
FIG. 1 is a block diagram depicting one implementation of an environment for identifying competitors using content items including content extensions, according to an illustrative implementation.

Following below are more detailed descriptions of various concepts related to, and implementations of, methods, apparatuses, and systems for providing functional extensions with a landing page of a creative. The various concepts introduced above and discussed in greater detail below may be implemented in any of numerous ways, as the described concepts are not limited to any particular manner of implementation. Examples of specific implementations and applications are provided primarily for illustrative purposes.

The present disclosure aims to increase the conversion rates of visitors of a landing page of a creative. In particular, a creative may be served on an information resource (for example, a webpage or mobile application) on a user computing device. A user of the user computing device can take an action on the creative (for example, click on the creative) that causes the user computing device to be directed to a landing page associated with the creative.

The present disclosure relates to providing functional extensions with a landing page of a creative. Functional extensions are actionable objects, which when actuated, provide additional functionality. In some implementations, the additional functionality can provide some type of measurable conversion. These functional extensions can include a click to call actionable object, which when actuated, establishes a phone call between the user and the phone number associated with the actionable object, such as the content provider associated with the landing page. Other examples of functional extensions include a directions actionable object, which when actuated, can cause a map application to launch to direct a user to a destination address associated with the actionable object.

According to some implementations, the methods and systems for providing functional extensions with a landing page of a creative can be performed by a data processing system. The data processing system can identify a creative for serving on a computing device. In some implementations, the data processing system can receive the creative from a third-party content provider. In some implementations, the data processing system can receive a request to serve the creative according to a content serving criteria. In some implementations, the creative can be associated with a network address of a landing page such that when an action is taken on the creative, the landing page associated with the network address can be rendered on a computing device on which the creative was served.

The data processing system can generate one or more functional extensions for rendering with the content of the landing page associated with the creative. In some implementations, the data processing system can analyze the content of the landing page to identify a particular type of content, for example, a phone number or an address. The data processing system can identify the particular type of content in the content of the landing page and use the identified particular type of content to generate a corresponding functional extension, such as a click-to-call actionable object or a directions actionable object.

In some implementations, in response to an action taken on the creative when the creative is served on the computing device, the functional extension can be served on a user interface with content of the landing page. In some implementations, the data processing system can generate an information resource that includes content of the landing page and the generated actionable object. The data processing system can associate a network address of the information resource to the creative such that responsive to an action taken on the creative, the information resource is rendered on the computing device on which the creative was served. In some implementations, the data processing system can render the actionable object on a first frame of the information resource and the content of the landing page on a second frame of the information resource. In some implementations, the first frame is rendered over the second frame.

In some implementations, the data processing system can provide a computer-executable script or software construct for insertion in the landing page associated with the creative. The script is configured to cause the generated actionable object to be rendered with the content of the landing page responsive to an action taken on the creative.

FIG. 1 is a block diagram depicting one implementation of an environment for providing functional extensions with a landing page of a creative. In particular, the system can be configured to provide functional extensions with a landing page of a creative. Functional extensions are actionable objects, which when actuated, provide additional functionality. In some implementations, the additional functionality can provide some type of measurable conversion. These functional extensions can include a click to call actionable object, which when actuated, establishes a phone call between the user and the phone number associated with the actionable object, such as the content provider associated with the landing page. Another example of a functional extension includes a directions actionable object, which when actuated, can cause a map application to launch to direct a user to a destination address associated with the actionable object. Functional extensions can also include content extensions. Content extensions are features included in creatives or other content items that provide additional functionality. These content extensions can include sitelinks, which are links, which when actuated, redirect a user to a specific web page corresponding to the actuated link. Other examples of content extensions include a rating extension, which indicates a rating of a particular product, service, item, entity or object, or a social aggregate annotation extension, which indicates a number of social networking users who have expressly approved the entity associated with the landing page with which the functional extension is rendered.

FIG. 1 illustrates an system 100 for providing functional extensions with a landing page of a creative via at least one computer network, such as the network 105. The network 105 can include computer networks such as the internet, local, wide, metro or other area networks, intranets, satellite networks, other computer networks such as voice or data mobile phone communication networks, and combinations thereof. The system 100 can also include at least one data processing system 110, e.g., at least one logic device such as a computing device or server having a processor to communicate via the network 105, for instance with at least one content provider computing device 115, at least one content publisher computing device 120, or at least one end user computing device 125.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one functional extension generation module 130, at least one landing page modification module 135 and at least one database 140. The functional extension generation module 130 and the landing page modification module 135 can each include at least one processing unit, server, virtual server, circuit, engine, agent, appliance, or other logic device such as programmable logic arrays configured to communicate with the database 140 and with other computing devices (e.g., the content provider computing device 115, the content publisher computing device 120, or the end user computing device 125) via the network 105.

The functional extension generation module 130 and the landing page modification module 135 can include or execute at least one computer program or at least one script. The functional extension generation module 130 and the landing page modification module 135 can be separate components, a single component, or part of the data processing system 110. The functional extension generation module 130 and the landing page modification module 135 can include combinations of software and hardware, such as one or more processors configured to execute one or more scripts to identify a creative for serving on a computing device, the creative associated with a network address of a landing page, generate an actionable object to be associated with content of the landing page and provide the actionable object to be served with content of the landing page responsive to an action taken on the creative when served on the computing device, for instance.

The content provider computing devices 115 can include servers or other computing devices operated by a content provider entity to provide content items such as advertisements for display on information resources at the end user computing device 125. The content provided by the content provider computing device 115 can include third party content items or creatives (e.g., ads) for display on information resources such as a website or web page that includes primary content, e.g. content provided by the content publisher computing device 120. The content items can also be displayed on a search results web page. For instance, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125, the content provider computing device 115, and the content publisher computing device 120 can include desktop computers, laptop computers, tablet computers, smartphones, personal digital assistants, mobile devices, end user computing devices, consumer computing devices, servers, clients, and other computing devices. The end user computing device 125, the content provider computing device 115, and the content publisher computing device 120 can include user interfaces such as microphones, speakers, touchscreens, keyboards, pointing devices, a computer mouse, touchpad, or other input or output interfaces.

The content provider computing devices 115, the content publisher computing device 120 and the end user computing devices 125 may be any number of different user electronic devices, for example, a laptop computer, a desktop computer, a tablet computer, a smartphone, a digital video recorder, a set-top box for a television, a video game console, or any other computing device configured to communicate via the network 105. The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C#, Java, JavaScript, Perl, Python and Visual Basic.

The content provider computing devices 115, the content publisher computing device 120 and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or advertiser can communicate with the data processing system 110 via the content provider computing device 115. In some implementations, the advertiser can communicate with the data processing system 110 via a user interface displayed on the user interface devices of the content provider computing device 115.

The data processing system 110 can include at least one server. In some implementations, the data processing system 110 includes a functional extension generation module 130 and a landing page modification module 135. The data processing system can also include one or more content repositories or databases 140. The data processing system 110 can be configured to identify a creative for serving on a computing device, the creative associated with a network address of a landing page, generate an actionable object to be associated with content of the landing page, and provide the actionable object to be served with content of the landing page responsive to an action taken on the creative when served on the computing device.

The functional extension generation module 130 can be part of, or can include scripts executed by, one or more servers in the data processing system 110. In some implementations, the functional extension generation module 130 can be designed, constructed or configured to identify a creative for serving on a computing device. The functional extension generation module 130 can identify the creative by receiving a request to serve a creative for a content serving or content placement campaign.

In some implementations, the functional extension generation module 130 can identify a creative eligible for participation in one or more content serving opportunities. In some implementations, the creative can be associated with a network address of a landing page such that when an action is taken on the creative, the landing page associated with the creative is rendered. In some implementations, the network address can be an IP address or a URL of the landing page. In some implementations, the functional extension generation module 130 can identify the creative by receiving a request to modify a landing page of a creative. In some implementations, the functional extension generation module 130 can be configured to receive a request to modify the landing page of a creative from a third-party content provider providing the creative to participate in content serving opportunities. In some implementations, the functional extension generation module 130 can receive the request responsive to a third-party content provider selecting an option on a user interface. In some implementations, the user interface can be a content placement campaign management user interface through which the third-party content provider can manage one or more content placement campaign.

In some implementations, the functional extension generation module 130 can automatically determine to modify a landing page of a creative without receiving a request. In some implementations, the functional extension generation module 130 can automatically determine to modify the landing page in response to determining that the creative is competing for content serving opportunities on mobile devices, such as smart phones, phablets or tablets. In some implementations, the functional extension generation module 130 can determine to modify a landing page of a creative responsive to analyzing a landing page associated with a creative provided to participate in content serving opportunities. In some implementations, the functional extension generation module 130 can determine to modify the landing page responsive to identifying that the landing page has not been optimized for a particular type of computing device. In some implementations, the functional extension generation module 130 can determine to modify the landing page responsive to identifying that the landing page is not rendered with one or more functional extensions.

The functional extension generation module 130 can be configured to generate an actionable object to be associated with content of the landing page. In some implementations, the functional extension generation module 130 can be configured to generate an actionable object responsive to receiving a request to modify a landing page of a creative. In some implementations, the functional extension generation module 130 can be configured to generate an actionable object responsive to receiving a request to optimize a landing page of a creative for a mobile device, such as a phablet or tablet.

In some implementations, the functional extension generation module 130 can receive information that can be used to generate one or more functional extensions. As described above, the functional extensions are actionable objects. In some implementations, the functional extension generation module 130 can receive functional extension generating information from a content provider associated with a landing page with which the actionable object is to be associated. Examples of such functional extension generating information can include a phone number, an address, amongst others. In some implementations, a content provider that communicates with the data processing system 110 to manage a content placement campaign may be configured to submit a request to participate in content serving opportunities. The request can include a creative and an associated landing page. In some implementations, the request can include a request to generate one or more functional extensions. In some implementations, the request can identify the types of functional extensions to generate for rendering with content of the landing page included in the request. In some implementations, the request can include a phone number or an address to be used for generating functional extensions.

In some implementations, the functional extension generation module 130 can be configured to generate one or more functional extensions responsive to identifying a landing page of a creative. In some implementations, the functional extension generation module 130 can inspect or analyze a landing page associated with a creative to determine if the landing page is optimized for rending on a mobile device. In some implementations, the functional extension generation module 130 may determine that the landing page may not be optimized for rendering on a mobile device if the landing page does not include one or more functional extensions through which a user of the mobile device on which the landing page is rendered is unable to perform additional functionality, such as placing a phone call to a phone number associated with the landing page or get directions to an address associated with the landing page. In some implementations, the functional extensions generation module 130 can identify one or more particular types of content included within the landing page. For example, the particular types of content can include phone numbers, addresses, or other content that can be used to generate functional extensions. In some implementations, the functional extensions generation module 130 can employ one or more scripts to identify phone numbers, addresses, or other content that can be used to generate functional extensions. For example, the script can identify an icon (for example, a "Book Now" icon) that is linked to a reservation page.

In some implementations, the functional extension generation module 130 can be configured to generate a functional extension using the information received within a request or using functional extension generating information determined from the landing page. In some implementations, the functional extension generation module can be configured to generate a functional extension using information retrieved from other sources, including one or more additional web pages associated with the landing page (such as from the same web site or from one or more web pages corresponding to links on the landing page). In some implementations, the functional extension generation module 130 can generate the functional extension as an actionable object. As such, the functional extension generation module 130 can define a triggering event, which when performed, actuates the actionable object. The triggering event can be performed responsive to a triggering action being performed. The triggering action can be a mouse over, a click, a tap, a selection, amongst others. In some implementations, the triggering action can be a gesture, such as a gesture to move the mobile phone on which the functional extension is rendered towards the user's ear (in the event of a click-to-call functional extension). In some implementations, the triggering action can be a voice activated command. In some implementations, the functional extension generation module 130 can define a region within which the triggering action is to occur in order for the triggering action to actuate the actionable object. For example, a click or tap on a particular icon or region of a display.

The functional extension generation module 130 can further define or associate an function to be performed by the computing device on which the functional extension is rendered in response to the performance of the triggering event associated with the functional extension. The function to be performed can be executed by the computing device. In some implementations, the functional extension generation module 130 can be configured to cause the computing device to launch a phone application responsive to the performance of the triggering even associated with a click-to-call functional extension. In some implementations, the computing device can provide a phone number associated with the functional extension to the phone application. In some implementations, the computing device can automatically trigger a phone call to be placed responsive to launching the phone application. In some implementations, the computing device can launch the phone application and initiate the phone call responsive to an additional input received from the user of the computing device.

In some implementations, the functional extension generation module 130 can be configured to cause the computing device to launch a map application responsive to the performance of the triggering even associated with a directions functional extension. In some implementations, the computing device can provide an address associated with the functional extension to the map application. In some implementations, the computing device can be configured to initiate one or more additional applications, for example, the computing device can actuate a GPS module such that the current location of the computing device can be determined and entered as the starting address in the map application.

In some implementations, responsive to identifying that the functional extension has been actuated, the functional extension generation module 130 can be configured to cause an instruction to be generated indicating that the functional extension has been actuated. In some implementations, the instruction can indicate a type of functional extension that has been actuated. The instruction can be received by a browser of the computing device or some other application of the computing device, which can cause the computing device to execute one or more instructions to perform the function associated with the functional extension. These instructions can include launching an appropriate application, providing data to the application, for example, the phone number or address associated with the functional extension, and initiating the execution of a function of the launched application.

In some implementations, the functional extension generation module 130 can be configured to generate one or more functional extensions for one or more landing pages identified as being able to benefit from having functional extensions. In some implementations, the functional extension generation module 130 can be configured to identify such landing pages in an offline process. In some implementations, the functional extension generation module 130 can be configured to analyze landing pages associated with creatives seeking to be served in one or more content serving opportunities. In some implementations, the functional extension generation module 130 can identify content providers associated with the landing pages that can benefit from having functional extensions. In some implementations, the benefit can be identified as a benefit that increases the conversion rate of visitors visiting the landing page. In some implementations, the conversions can be measured as a number of calls made to the content provider associated with the landing page. In some implementations, the conversions can be measured as a number of emails sent to the content provider associated with the landing page. In some implementations, the conversions can be measured as a number of people who subscribe with the content provider associated with the landing page via the landing page, amongst others.

In some implementations, the functional extension generation module 130 can be configured to generate a functional extension such that it visually matches the content of the landing page with which the functional extension is to be rendered. In some implementations, the functional extension can be designed, shaped, sized or otherwise configured such that it appears at a top portion of a display. In some implementations, the functional extension can be designed, shaped, sized or otherwise configured such that it appears at a bottom portion of a display. In some implementations, the functional extension can be designed, shaped, sized or otherwise configured such that it appears as an overlap over the landing page. In some implementations, the functional extension can be designed, shaped, sized or otherwise configured such that it appears as a pop up window over the landing page. In some implementations, the functional extension can include graphical icons indicating the type of functional extension. For instance, a click-to-call functional extension can appear as an object that includes a phone icon. In some implementations, the functional extension can be designed, shaped, sized or otherwise configured to fit within a display of the computing device on which the functional extension is being rendered. In some implementations, the functional extension can be displayed with other functional extensions.

In some implementations, the functional extension generation module 130 can be configured to store the functional extensions in a data store, such as the database 140. In some implementations, the functional extension generation module 130 can be configured to store the functional extensions such that another module of the data processing system 110 can access the functional extensions. In some implementations, the functional extension generation module 130 can be configured to store the functional extensions such that the landing page modification module 135 can be configured to retrieve and utilize the generated functional extensions.

The landing page modification module 135 can be configured to render one or more functional extensions with content of the landing page responsive to an action taken on the creative when served on the computing device. In some implementations, the landing page modification module 135 can be configured to render the actionable object with content of the landing page of a creative in response to an action taken on the creative.

In some implementations, the landing page modification module 135 can be configured to generate an information resource (for example, a web page) that includes content of the landing page and one or more functional extensions generated by the functional extension generation module 130 that corresponds to the landing page. In some implementations, the landing page modification module 135 can be further configured to associate a network address of the information resource to the creative such that responsive to an action taken on the creative, the information resource is rendered.

In some implementations, in response to the data processing system 110 receiving a creative for serving in content serving opportunities, the landing page modification module 135 can be configured to identify a landing page associated with the creative. The landing page modification module 135 can be configured to generate an information resource that is to serve as a new landing page for the creative. The information resource can be managed, maintained or hosted by the data processing system 110. The information resource can be configured to include the contents of the landing page originally associated with the creative.

The landing page modification module 135 can further be configured to include one or more functional extensions in the information resource, such that when the information resource is rendered on a computing device, both the landing page originally associated with the creative and the one or more functional extensions are rendered. In some implementations, the landing page modification module 135 can be configured to render the functional extensions at a top portion of the display of the computing device while rendering the landing page originally associated with the creative below the functional extensions. Conversely, in some implementations, the landing page modification module 135 can be configured to render the functional extensions at a bottom portion of the display of the computing device while rendering the landing page originally associated with the creative above the functional extensions. In some implementations, the landing page modification module 135 can be configured to render the functional extensions as an overlay over the landing page originally associated with the creative. In some implementations, the functional extensions can be minimized or otherwise hidden from the display. In some implementations, the functional extensions can be rendered in the same frame of the information resource in which the primary content of the landing page is rendered. In some implementations, an actionable item can be provided by the landing page modification module, which when actuated, causes the functional extensions to hide from view if visible. Stated in another way, the actionable item can be a minimize button or object, which when selected, removes a frame in which the functional extensions are rendered from the display. In some implementations, an actionable object can be provided by the landing page modification module 135, which when actuated, causes the functional extensions to become visible on the display if it is not already visible.

In some implementations, the information resource can include a plurality of frames, of which one frame can be shaped, sized or otherwise configured to render the content of the landing page originally associated with the creative. In some implementations, the information resource can be configured to render the one or more functional extensions on a second frame separate from the frame in which the content of the landing page originally associated with the creative is rendered. In some implementations, the frame in which the functional extensions are rendered can be positioned over the frame in which the content of the landing page originally associated with the creative is rendered.

In some implementations, the landing page modification module 135 can be configured to monitor activity that occurs at the information resource generated by the landing page modification module 135. In some implementations, the landing page modification module 135 can be configured to increment a counter identifying a total number of times a functional extension has been actuated each time a functional extension is actuated. In some implementations, the counter can be specific to a particular type of functional extension. In some implementations, the landing page modification module 135 can identify a number of visits to the information resource. In some implementations, the landing page modification module 135 can identify a number of visits that resulted in an action being taken on each of the one or more functional extensions rendered. In some implementations, the landing page modification module 135 can be configured to determine a conversion rate based on a ratio of the number of visits that resulted in an action being taken on the one or more functional extensions to the total number of visits to the information resource.

In some implementations, the landing page modification module 135 can also be configured to determine a conversion rate of a creative associated with the information resource. In some implementations, the landing page modification module 135 can, via one or more additional modules of the data processing system 110, determine a total number of times the creative was served. The landing page modification module 135 can determine a conversion rate of the creative by determining a ratio of a total number of visits to the landing page via the creative to the number of times the creative was served.

In some implementations, the landing page modification module 135 can be configured to provide the content provider associated with the creative a script or other software construct through which the landing page originally associated with the creative can be modified to include one or more functional extensions. In some implementations, the script can be inserted or embedded within in the landing page. In some implementations, the landing page modification module 135 can be configured to modify the software code associated with the landing page to insert the script within the software code. In some implementations, the script can be configured to communicate with a server of the data processing system 110. In some implementations, the script can be configured to modify the landing page associated with the creative such that when the landing page is rendered on a computing device of a user, the content of the landing page is rendered with one or more functional extensions. In some implementations, the script can be configured to call on the server of the data processing system 110 to retrieve one or more functional extensions generated for rendering with the content of the landing page. In some implementations, the script can be configured to generate one or more functional extensions and render the generated functional extensions without having the functional extension generation module 130 generate the functional extensions. In some implementations, the script can include instructions for generating the functional extensions. In some implementations, the script can include the functional extension generation module 130. In some implementations, the content provider computing device 115 can render the modified landing page, which includes the content of the landing page originally associated with the creative and the functional extensions to the end user computing device 125. In some implementations, the content provider computing device 115 can execute the script such that the functional extensions are rendered with the content of the landing page originally associated with the creative when the modified landing page is served or rendered on the end user computing device 125.

The data processing system 110 can also include one or more data stores, such as the database 140. The database can be included in the data processing system 110. In some implementations, the database may be located remote to the data processing system but accessible by the data processing system. The database can store a wide variety of content. For example, the database can store auction log data, including auction log data corresponding to the various types of content extensions. It should be appreciated that the data processing system 110 can include one or more additional modules to provide some or all of the features described herein as well as other additional features.

Figure 2:
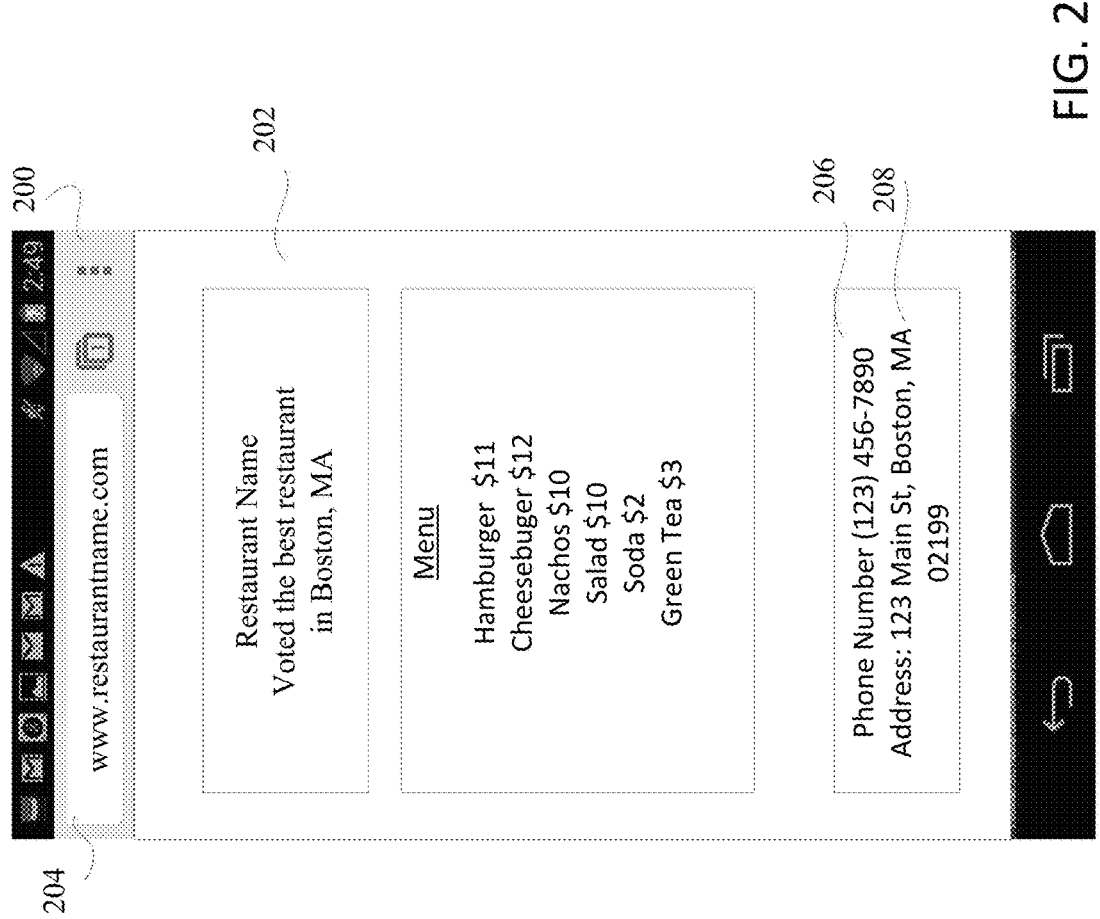
FIG. 2 is a screenshot of a landing page of a creative.

FIG. 2 is a screenshot of a display including a landing page of a creative. In some implementations, a display 200 includes content of a landing page 202 can be a landing page provided by a content provider. In some implementations, the landing page 202 can have a network address 204, such as an IP address or URL that is associated with the content provider configured to provide a creative with which the landing page is associated. As shown in FIG. 2, the URL of the landing page is www.restaurantname.com, which is hosted by the content provider or any other entity with which the content provider chooses to link the creative. In some implementations the landing page can include particular types of content, for example, a phone number 206 or an address 208, which can be used to generate functional extensions.

Figures 3A, 3B:
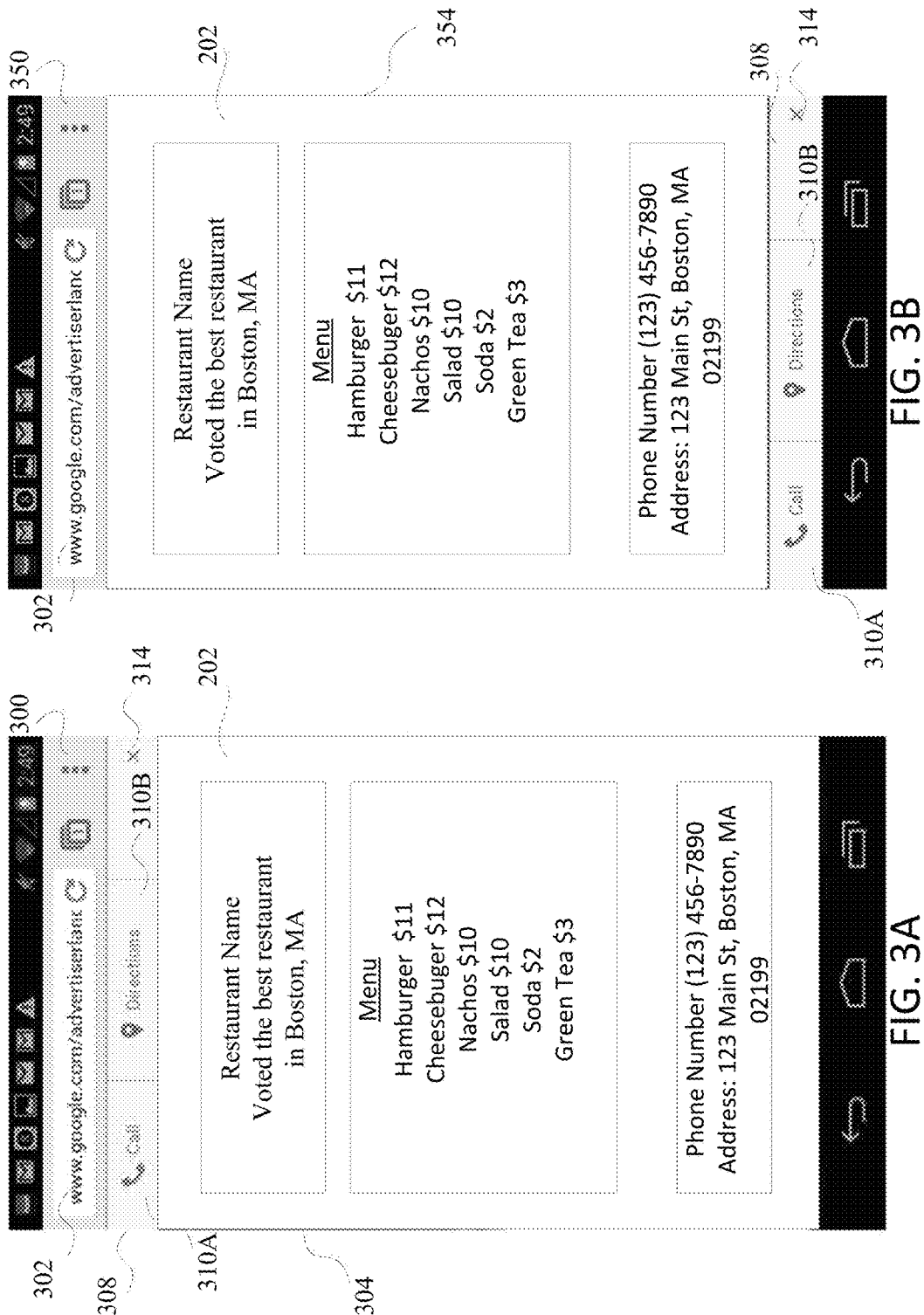
FIG. 3A is a screenshot of a display of an information resource that includes content of the landing page and functional extensions displayed at a top portion of the display.
FIG. 3B is a screenshot of a display of an information resource that includes content of the landing page and functional extensions displayed at a bottom portion of the display.

FIG. 3A is a screenshot of a display of an information resource that includes content of the landing page and functional extensions displayed at a top portion of the display. The display 300 includes an information resource 304 that corresponds to a destination address 302 that is associated with the data processing system 110 (shown in FIG. 1). The information resource 304 can include content of the landing page 202 (shown in FIG. 2) rendered in a first frame and a plurality of functional extensions rendered in a functional extension frame 308. The functional extension frame 308 includes a first functional extension 310A, which is depicted as a click-to-call functional extension, and a second functional extension 310B, which is depicted a directions functional extension. The functional extension frame 308 also includes an actionable item 314 for minimizing or hiding the functional extension frame from the display. Responsive to an action taken on the actionable item 314, the functional extension frame can be removed from the display 300. Responsive to an action taken on the click-to-call functional extension 310A, the computing device can be triggered to launch a phone application to establish a call with the phone number (for example, phone number 206) associated with the functional extension 310A. Responsive to an action taken on the directions functional extension 310B, the computing device can be triggered to launch a map application to provide directions to an address (for example, address 208) associated with the functional extension 310A.

FIG. 3B is a screenshot of a display of an information resource that includes content of the landing page and functional extensions displayed at a bottom portion of the display. This display is very similar to the display shown in FIG. 3A except that the functional extension frame 308 is positioned at a bottom portion of the display 350 such that the frame displaying the content of the landing page 202 is positioned above the functional extension frame 308.

Figure 4:
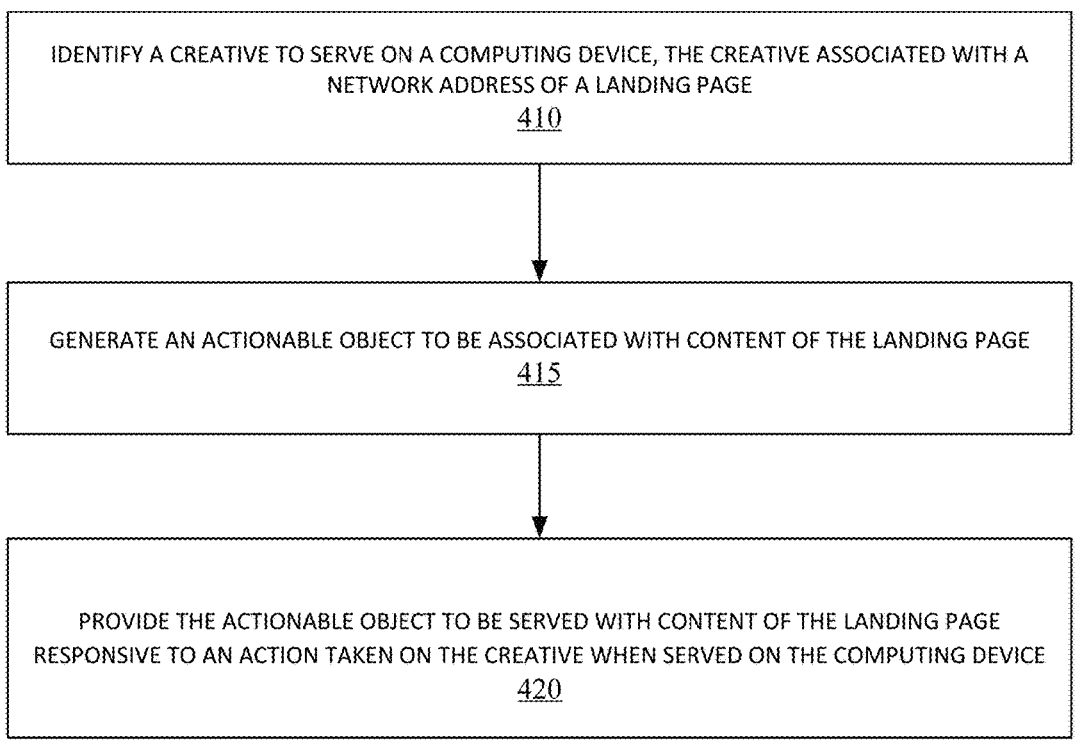
FIG. 4 is a flow diagram depicting one implementation of the steps taken to render functional extensions with a landing page of a creative.

FIG. 4 is a flow diagram depicting one implementation of the steps taken to render functional extensions with a landing page of a creative. In particular, FIG. 4 illustrates a flow diagram depicting a method 400 for providing actionable objects on a landing page of a creative. In some implementations, the method can be executed by a data processing system, such as the data processing system 110 shown in FIG. 1. In brief overview, the method includes identifying a creative for serving on a computing device (BLOCK 405), generating an actionable object to be rendered with content of the landing page (BLOCK 410) and providing the actionable object to be rendered with the content of the landing page responsive to an action taken on the creative when served on the computing device (BLOCK 415).

In further detail, the data processing system can identify a creative for serving on a computing device (BLOCK 405). In some implementations, the data processing system can identify a creative eligible for participation in one or more content serving opportunities. In some implementations, the creative can be associated with a network address of a landing page such that when an action is taken on the creative, the landing page associated with the creative is rendered. In some implementations, the network address can be an IP address or a URL of the landing page. In some implementations, the data processing system can identify the creative by receiving a request to modify a landing page of a creative. In some implementations, the data processing system can receive a request to modify the landing page of a creative from a third-party content provider providing the creative to participate in content serving opportunities. In some implementations, the data processing system can receive the request responsive to a third-party content provider selecting an option on a user interface. In some implementations, the user interface can be a content placement campaign management user interface through which the third-party content provider can manage one or more content placement campaign.

In some implementations, the data processing system, as part of identifying a creative for serving on a computing device, can automatically determine to modify a landing page of a creative without receiving a request. In some implementations, the data processing system can automatically determine to modify the landing page in response to determining that the creative is competing for content serving opportunities on mobile devices, such as smart phones, phablets or tablets. In some implementations, the data processing system can determine to modify a landing page of a creative responsive to analyzing a landing page associated with a creative provided to participate in content serving opportunities. In some implementations, the data processing system can determine to modify the landing page responsive to identifying that the landing page has not been optimized for a particular type of computing device. In some implementations, the data processing system can determine to modify the landing page responsive to identifying that the landing page is not rendered with one or more functional extensions.

The data processing system can generate a functional extension to be rendered with content of the landing page (BLOCK 410). In some implementations, the functional data processing system can generate a functional extension responsive to receiving a request to modify a landing page of a creative. In some implementations, the data processing system can generate an actionable object responsive to receiving a request to optimize a landing page of a creative for a mobile device, such as a phablet or tablet.

In some implementations, the data processing system can receive information that can be used to generate one or more functional extensions. As described above, the functional extensions are actionable objects. In some implementations, the data processing system can receive functional extension generating information from a content provider associated with a landing page with which the actionable object is to be associated. Examples of such functional extension generating information can include a phone number, an address, amongst others. In some implementations, a content provider that communicates with the data processing system to manage a content placement campaign may be configured to submit a request to participate in content serving opportunities. The request can include a creative and an associated landing page. In some implementations, the request can include a request to generate one or more functional extensions. In some implementations, the request can identify the types of functional extensions to generate for rendering with content of the landing page included in the request. In some implementations, the request can include a phone number or an address to be used for generating functional extensions.

In some implementations, the data processing system can be configured to generate one or more functional extensions responsive to identifying a landing page of a creative. In some implementations, the data processing system can inspect or analyze a landing page associated with a creative to determine if the landing page is optimized for rending on a mobile device. In some implementations, the data processing system may determine that the landing page may not be optimized for rendering on a mobile device if the landing page does not include one or more functional extensions through which a user of the mobile device on which the landing page is rendered is unable to perform additional functionality, such as placing a phone call to a phone number associated with the landing page or get directions to an address associated with the landing page. In some implementations, the data processing system can identify one or more particular types of content included within the landing page. For example, the particular types of content can include phone numbers, addresses, or other content that can be used to generate functional extensions. In some implementations, the data processing system can employ one or more scripts to identify phone numbers, addresses, or other content that can be used to generate functional extensions. For example, the script can identify an icon (for example, a "Book Now" icon) that is linked to a reservation page.

In some implementations, the data processing system can be configured to generate a functional extension using the information received within a request or using functional extension generating information determined from the landing page. In some implementations, the functional extension generation module can be configured to generate a functional extension using information retrieved from other sources, including one or more additional web pages associated with the landing page (such as from the same web site or from one or more web pages corresponding to links on the landing page). In some implementations, the data processing system can generate the functional extension as an actionable object. As such, the data processing system can define a triggering event, which when performed, actuates the actionable object. The triggering event can be performed responsive to a triggering action being performed. The triggering action can be a mouse over, a click, a tap, a selection, amongst others. In some implementations, the triggering action can be a gesture, such as a gesture to move the mobile phone on which the functional extension is rendered towards the user's ear (in the event of a click-to-call functional extension). In some implementations, the triggering action can be a voice activated command. In some implementations, the data processing system can define a region within which the triggering action is to occur in order for the triggering action to actuate the actionable object. For example, a click or tap on a particular icon or region of a display.

The data processing system can further define or associate an function to be performed by the computing device on which the functional extension is rendered in response to the performance of the triggering event associated with the functional extension. The function to be performed can be executed by the computing device. In some implementations, the data processing system can be configured to cause the computing device to launch a phone application responsive to the performance of the triggering even associated with a click-to-call functional extension. In some implementations, the computing device can provide a phone number associated with the functional extension to the phone application. In some implementations, the computing device can automatically trigger a phone call to be placed responsive to launching the phone application. In some implementations, the computing device can launch the phone application and initiate the phone call responsive to an additional input received from the user of the computing device.

In some implementations, the data processing system can cause the computing device to launch a map application responsive to the performance of the triggering even associated with a directions functional extension. In some implementations, the computing device can provide an address associated with the functional extension to the map application. In some implementations, the computing device can be configured to initiate one or more additional applications, for example, the computing device can actuate a GPS module such that the current location of the computing device can be determined and entered as the starting address in the map application.

In some implementations, responsive to identifying that the functional extension has been actuated, the data processing system can cause an instruction to be generated indicating that the functional extension has been actuated. In some implementations, the instruction can indicate a type of functional extension that has been actuated. The instruction can be received by a browser of the computing device or some other application of the computing device, which can cause the computing device to execute one or more instructions to perform the function associated with the functional extension. These instructions can include launching an appropriate application, providing data to the application, for example, the phone number or address associated with the functional extension, and initiating the execution of a function of the launched application.

In some implementations, the data processing system can generate one or more functional extensions for one or more landing pages identified as being able to benefit from having functional extensions. In some implementations, the data processing system can identify such landing pages in an offline process. In some implementations, the data processing system can analyze landing pages associated with creatives seeking to be served in one or more content serving opportunities. In some implementations, the data processing system can identify content providers associated with the landing pages that can benefit from having functional extensions. In some implementations, the benefit can be a benefit that increases the conversion rate of visitors visiting the landing page. In some implementations, the conversions can be measured as a number of calls made to the content provider associated with the landing page. In some implementations, the conversions can be measured as a number of emails sent to the content provider associated with the landing page. In some implementations, the conversions can be measured as a number of people who subscribe with the content provider associated with the landing page via the landing page, amongst others.

In some implementations, the data processing system can generate a functional extension such that it visually matches the content of the landing page with which the functional extension is to be rendered. In some implementations, the functional extension can be designed, shaped, sized or otherwise configured such that it appears at a top portion of a display. In some implementations, the functional extension can be designed, shaped, sized or otherwise configured such that it appears at a bottom portion of a display. In some implementations, the functional extension can be designed, shaped, sized or otherwise configured such that it appears as an overlap over the landing page. In some implementations, the functional extension can be designed, shaped, sized or otherwise configured such that it appears as a pop up window over the landing page. In some implementations, the functional extension can include graphical icons indicating the type of functional extension. For instance, a click-to-call functional extension can appear as an object that includes a phone icon. In some implementations, the functional extension can be designed, shaped, sized or otherwise configured to fit within a display of the computing device on which the functional extension is being rendered. In some implementations, the functional extension can be displayed with other functional extensions.

In some implementations, the data processing system can store the functional extensions in a data store, such as the database 140 shown in FIG. 1. In some implementations, the data processing system can store the functional extensions such that the data processing system can retrieve and utilize the generated functional extensions at a later time.

The data processing system can provide the functional extension to be rendered with the content of the landing page responsive to an action taken on the creative when served on the computing device (BLOCK 415). In some implementations, the data processing system can provide the functional extension for insertion into an information resource that is to be rendered on a computing device responsive to an action taken on a creative associated with the functional extension when the creative is served on the computing device. In some implementations, the data processing system can render the functional extension with content of the landing page of the creative.

In some implementations, the data processing system can generate an information resource (for example, a web page) that includes content of the landing page and one or more functional extensions that correspond to the landing page. In some implementations, the data processing system can associate a network address of the information resource to the creative such that responsive to an action taken on the creative, the information resource is rendered. In some implementations, the data processing system can replace the network address associated with the creative from the network address associated with a landing page originally provided with the creative by the content provider to a network address of the information resource generated by the data processing system.

In some implementations, in response to the data processing system receiving a creative for serving in content serving opportunities, the data processing system can identify a landing page associated with the creative. The data processing system can generate an information resource that is to serve as a new landing page for the creative. The information resource can be managed, maintained or hosted by the data processing system. The information resource can be configured to include the contents of the landing page originally associated with the creative.

The data processing system can include one or more functional extensions in the information resource, such that when the information resource is rendered on a computing device, both the landing page originally associated with the creative and the one or more functional extensions are rendered. In some implementations, the data processing system can render the functional extensions at a top portion of the display of the computing device while rendering the landing page originally associated with the creative below the functional extensions. Conversely, in some implementations, the data processing system can render the functional extensions at a bottom portion of the display of the computing device while rendering the landing page originally associated with the creative above the functional extensions. In some implementations, the data processing system can render the functional extensions as an overlay over the landing page originally associated with the creative. In some implementations, the functional extensions can be minimized or otherwise hidden from the display. In some implementations, an actionable item can be provided by the data processing system, which when actuated, causes the functional extensions to hide from view if visible. In some implementations, an actionable item can be provided by the data processing system, which when actuated, causes the functional extensions to become visible on the display if it is not already visible.

In some implementations, the information resource can include a plurality of frames, of which one frame can be shaped, sized or otherwise configured to render the content of the landing page originally associated with the creative. In some implementations, the information resource can be configured to render the one or more functional extensions on a second frame separate from the frame in which the content of the landing page originally associated with the creative is rendered. In some implementations, the frame in which the functional extensions are rendered can be positioned over the frame in which the content of the landing page originally associated with the creative is rendered.

In some implementations, the data processing system can monitor activity that occurs at the information resource generated by the data processing system. In some implementations, the data processing system can increment a counter identifying a total number of times a functional extension has been actuated each time a functional extension is actuated. In some implementations, the counter can be specific to a particular type of functional extension. In some implementations, the data processing system can identify a number of visits to the information resource. In some implementations, the data processing system can identify a number of visits that resulted in an action being taken on each of the one or more functional extensions rendered. In some implementations, the data processing system can determine a conversion rate based on a ratio of the number of visits that resulted in an action being taken on the one or more functional extensions to the total number of visits to the information resource.

In some implementations, the data processing system can determine a conversion rate of a creative associated with the information resource. In some implementations, the data processing system can determine a total number of times the creative was served. The data processing system can determine a conversion rate of the creative by determining a ratio of a total number of visits to the landing page via the creative to the number of times the creative was served.

In some implementations, the data processing system can provide the content provider associated with the creative a script or other software construct through which the landing page originally associated with the creative can be modified to include one or more functional extensions. In some implementations, the script can be inserted or embedded within in the landing page. In some implementations, the data processing system can modify the software code associated with the landing page to insert the script within the software code. In some implementations, the script can be configured to communicate with a server of the data processing system. In some implementations, the script can be configured to modify the landing page associated with the creative such that when the landing page is rendered on a computing device of a user, the content of the landing page is rendered with one or more functional extensions. In some implementations, the script can be configured to call on the server of the data processing system to retrieve one or more functional extensions generated for rendering with the content of the landing page. In some implementations, the script can be configured to generate one or more functional extensions and render the generated functional extensions without having the data processing system generate the functional extensions. In some implementations, the script can include instructions for generating the functional extensions. In some implementations, the content provider computing device can render the modified landing page, which includes the content of the landing page originally associated with the creative and the functional extensions to the end user computing device. In some implementations, the content provider computing device can execute the script such that the functional extensions are rendered with the content of the landing page originally associated with the creative the modified landing page is served or rendered on the end user computing device 125.

Figure 5:
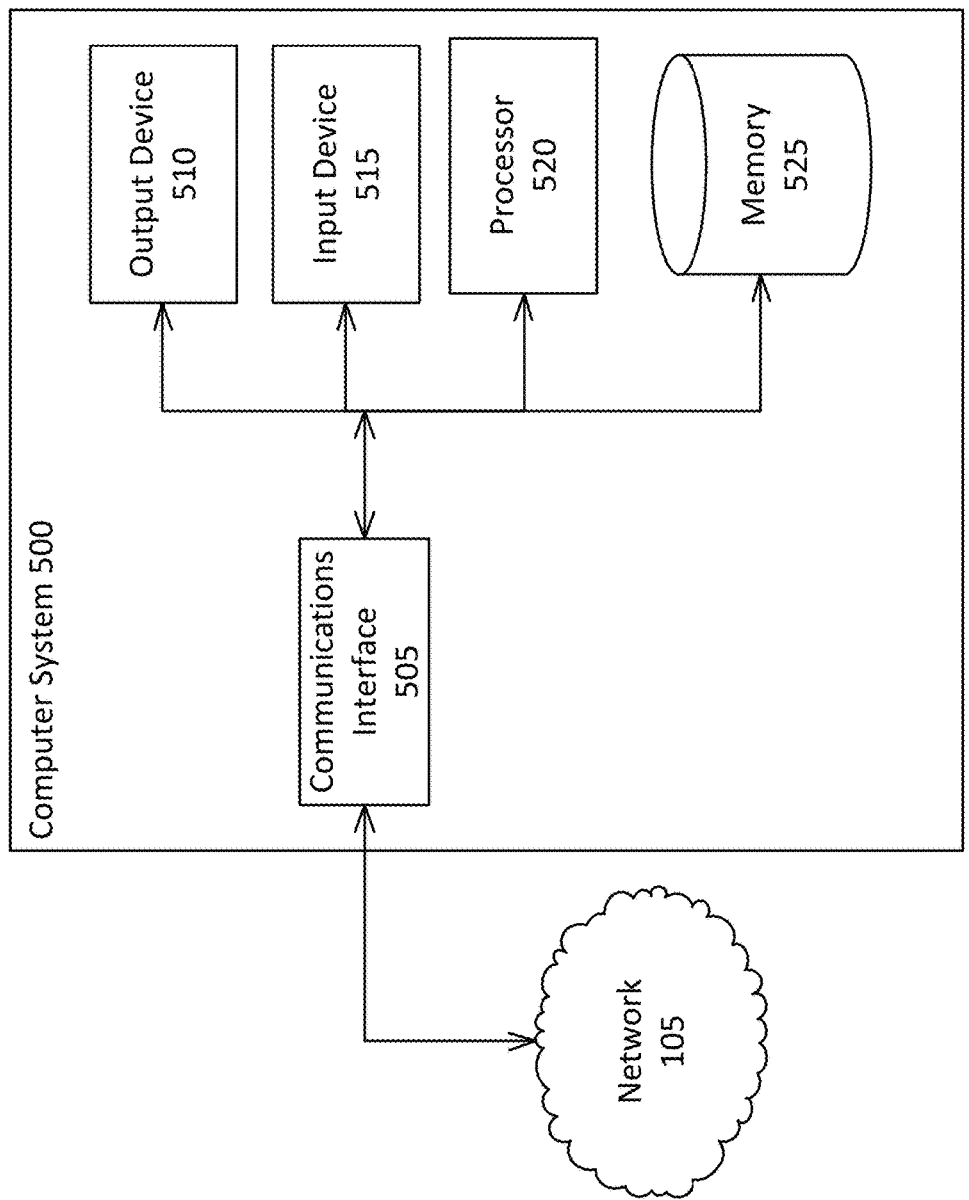
FIG. 5 is a block diagram illustrating an implementation of a general architecture for a computer system that may be employed to implement various elements of the systems and methods described and illustrated herein.

FIG. 5 shows the general architecture of an illustrative computer system 500 that may be employed to implement any of the computer systems discussed herein (including the system 100 and its components such as the functional extension generation module 130 and the landing page modification module 135) in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 110 or the other components of the system 100 such as the functional extension generation module 130 and the landing page modification module 135.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the data processing system 110 can include the memory 525 to store information related to one or more creatives, one or more information resources generated for the creatives and one or more functional extensions generated for rendering with content of landing pages associated with the creatives. The memory 525 can include the database 140. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the data processing system 110.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The functional extension generation module 130 and the landing page modification module 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 500 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the functional extension generation module 130 and the landing page modification module 135 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to an advertising program, the systems and methods described herein can be applied to any program in any vertical in which image-based content can be created from text-based content. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to provide actionable objects on landing pages of content items, comprising:
   a data processing system having one or more data processors and one or more computer-readable storage media storing instructions, the data processing system to:
   receive, via a third-party content provider device of a third-party content provider remote from the data processing system, a plurality of content items for serving on information resources, at least one of the plurality of content items comprising a network address of a landing page of the third-party content provider;
   identify a content item of the plurality of content items received from the third-party content provider device to serve on a computing device different from the third-party content provider device, the content item associated with the network address of the landing page of the third-party content provider device;
   determine that the landing page associated with the content item does not include any functional extensions;
   identify a type of content of the landing page of the third-party content provider by analyzing the landing page associated with the network address of the content item, the type of content of the landing page including a phone number of the third-party content provider;
   receive, from a landing page modification module that increments a counter identifying a total number of actuations of a functional extension on the landing page, an indication of a conversion rate based on a ratio of a number of visits to the landing page that resulted in an action being taken on the functional extension to a total number of visits to the landing page;
   determine, responsive to receipt of the content item, identification of the type of content of the landing page including the phone number, the conversion rate and the determination that the landing page does not include any functional extensions, to provision the functional extension for the landing page associated with the content item based on an increase in interaction rate with the landing page of the third-party content provider relative to the landing page lacking the functional extension;
   generate, responsive to the determination to provision the functional extension and receipt of the content item from the third-party content provider device, the functional extension to be rendered with content of the landing page of the third-party content provider based on the identified type of content of the landing page, the functional extension configured to trigger, in response to a voice activated command sensed by a microphone of the computing device, the computing device to actuate an object to establish a call between the computing device and a content provider device associated with the phone number of the third-party content provider;
   generate an information resource that includes the content of the landing page of the third-party content provider and the generated functional extension, the generated functional extension in a separate overlay frame over the content of the landing page of the third-party content provider; and
   serve, to the computing device, the generated information resource to render the content of the landing page of the third-party content provider and the generated functional extension on a display of the computing device responsive to an action taken on the content item, the computing device actuating the object to establish the call between the computing device and the content provider device associated with the phone number responsive to the voice activated command that triggers the functional extension.

2. The system of claim 1, comprising the data processing system to:
   launch a script to identify the phone number on the landing page based on an icon.

3. The system of claim 1, comprising the data processing system to:
   provide, in response to the voice active command, sensory feedback comprising acoustic or speech.

4. The system of claim 1, comprising the data processing system to:
   generate a second functional extension to be rendered with the content of the landing page of the third-party content provider based on a second identified type of content of the landing page, the second functional extension configured to cause the computing device to actuate a positioning module of the computing device to identify a current location of the computing device and to launch a map application on the computing device with the current location as a starting location and a target address as a destination location; and
   provide the second functional extension in a second separate overlay frame over the content of the landing page of the third-party content provider.

5. The system of claim 1, comprising the data processing system to:
   generate a second functional extension to be rendered with the content of the landing page of the third-party content provider based on a second identified type of content of the landing page, the second functional extension configured to cause the computing device to actuate a positioning module of the computing device to identify a current location of the computing device and to launch a map application on the computing device with the current location as a starting location and a target address as a destination location; and serve, to the computing device, the generated information resource to render the content of the landing page of the third-party content provider and the second generated functional extension on the display of the computing device, the computing device actuating the positioning module to identify the current location of the computing device and launching the map application with the current location as the starting location and the target address included on the content of the landing page as the destination location responsive to a selection of a portion of the second functional extension.

6. The system of claim 1, comprising the data processing system to:
render the functional extension in a first frame of the information resource and the content of the landing page in a second frame of the information resource, wherein the first frame is rendered over the second frame.

7. The system of claim 1, comprising the data processing system to:
receive, in response to serving the information resource, an indication of the action taken on the functional extension; and
increment a conversion count responsive to receiving the indication.

8. The system of claim 1, comprising the data processing system to:
generate the functional extension configured to determine to modify the landing page responsive to identifying that the landing page has not been configured for a particular type of computing device.

9. The system of claim 1, comprising the data processing system to:
generate the functional extension configured to determine to modify the landing page responsive to identifying that the landing page is not rendered with functional extensions.

10. The system of claim 1, comprising the data processing system to:
provide a script for insertion in the landing page associated with the content, the script configured to cause the generated functional extension to be rendered for display with the content of the landing page responsive to the action taken on the content item.

11. A method of providing actionable objects on landing pages of content items, comprising:
receiving, via a third-party content provider device of a third-party content provider remote from a data processing system having one or more processors, a plurality of content items for serving on information resources, at least one of the plurality of content items comprising a network address of a landing page of the third-party content provider;
identifying, by the data processing system, a content item of the plurality of content items received from the third-party content provider device for serving on a computing device different from the third-party content provider device, the content item associated with the network address of the landing page of the third-party content provider;
determining, by the data processing system, that the landing page associated with the content item does not include any functional extensions;
identifying, by the data processing system, a type of content of the landing page of the third-party content provider by analyzing the landing page associated with the network address of the content item, the type of content of the landing page including a phone number associated with the third-party content provider;
receiving, by the data processing system from a landing page modification module that increments a counter identifying a total number of actuations of a functional extension on the landing page, an indication of a conversion rate based on a ratio of a number of visits to the landing page that resulted in an action being taken on the functional extension to a total number of visits to the landing page;
determining, responsive to receiving the content item, identifying the type of content of the landing page including the phone number, the conversion rate and determining that the landing page does not include any functional extensions, to provision the functional extension for the landing page associated with the content item based on an increase in interaction rate with the landing page of the third-party content provider relative to the landing page content item lacking the functional extension;
generating, by the data processing system, responsive to the determination to provision the functional extension and receiving the content item from the third-party content provider device, the functional extension to be rendered with content of the landing page of the third-party content provider based on the identified type of content of the landing page, the functional extension configured to trigger, in response to a voice activated command sensed by a microphone of the computing device, the computing device to actuate an object to establish a call between the computing device and a content provider device associated with the phone number of the third-party content provider;
generating, by the data processing system, an information resource that includes the content of the landing page of the third-party content provider and the generated functional extension, the generated functional extension in a separate overlay frame over the content of the landing page of the third-party content provider; and
serving, by the data processing system to the computing device, the generated information resource to render the content of the landing page of the third-party content provider and the generated functional extension on a display of the computing device responsive to an action taken on the content item, the computing device actuating the object to establish the call between the computing device and the content provider device associated with the phone number responsive to the voice activated command that triggers the functional extension.

12. The method of claim 11, comprising:
launching a script to identify the phone number on the landing page based on an icon.

13. The method of claim 11, comprising:
providing, in response to the voice active command, sensory feedback comprising acoustic or speech.

14. The method of claim 11, comprising:
generating a second functional extension to be rendered with the content of the landing page of the third-party content provider based on a second identified type of content of the landing page, the second functional extension configured to cause the computing device to actuate a positioning module of the computing device to identify a current location of the computing device and to launch a map application on the computing device with the current location as a starting location and a target address as a destination location; and providing the second functional extension in a second separate overlay frame over the content of the landing page of the third-party content provider.

15. The method of claim 11, comprising:

generating a second functional extension to be rendered with the content of the landing page of the third-party content provider based on a second identified type of content of the landing page, the second functional extension configured to cause the computing device to actuate a positioning module of the computing device to identify a current location of the computing device and to launch a map application on the computing device with the current location as a starting location and a target address as a destination location; and serving, to the computing device, the generated information resource to render the content of the landing page of the third-party content provider and the second generated functional extension on the display of the computing device, the computing device actuating the positioning module to identify the current location of the computing device and launching the map application with the current location as the starting location and the target address included on the content of the landing page as the destination location responsive to a selection of a portion of the second functional extension.

16. The method of claim 11, comprising:

rendering the functional extension in a first frame of the information resource and the content of the landing page in a second frame of the information resource, wherein the first frame is rendered over the second frame.

17. The method of claim 11, comprising:

receiving, in response to serving the information resource, an indication of the action taken on the functional extension; and incrementing a conversion count responsive to receiving the indication.

18. The method of claim 11, comprising:

generating the functional extension configured to determine to modify the landing page responsive to identifying that the landing page has not been configured for a particular type of computing device.

19. The method of claim 11, comprising:

generating the functional extension configured to determine to modify the landing page responsive to identifying that the landing page is not rendered with functional extensions.

20. The method of claim 11, comprising:

providing a script for insertion in the landing page associated with the content, the script configured to cause the generated functional extension to be rendered for display with the content of the landing page responsive to the action taken on the content item.

* * * * *